2,780,611

PIGMENTED SILICONE ELASTOMERS

Theodore A. Te Grotenhuis, Olmsted Falls, Ohio, assignor of twenty percent to The General Tire & Rubber Company, Akron, Ohio, a corporation of Ohio No Drawing. Application March 19, 1952, Serial No. 277,547

8 Claims. (Cl. 260—37)

This application is a continuation-in-part of my application Serial No. 585,824, filed March 30, 1945, entitled Pigmented Compositions and Methods of Making Same, and my application Serial No. 714,919, filed December 7, 1946, entitled Pigmented Silicone Elastomers, now Patent No. 2,610,167.

The invention relates to the preparation of pigmented silicone elastomers and is particularly concerned with the process of reinforcing silicone elastomers to provide increased strength and other properties.

It is well known that silicone elastomers or silicone rubbers with which the present invention is primarily concerned are able to withstand temperatures which are destructive to other elastomers. They heretofore have had exceptionally low tensile strength, which rarely, if ever, exceeded 600 or 700 lbs./sq. in., even when compounded with the most desirable filling materials available. It has not been possible prior to my invention to obtain reinforcement of silicone rubbers with carbon black, either because the carbon black has little affinity for the inorganic portion of the silicone or because the carbon black tends to absorb the curing agents necessary for curing of the silicone elastomers, or because of both of these reasons.

It is an object of the present invention to provide a method of compounding silicone elastomers to obtain a high temperature-resistant material having improved properties.

It is another object of the present invention to provide a method of compounding organosilicone elastomeric material wherein fine or very high surface area pigments are utilized to obtain substantial reinforcement.

It is a further object of the present invention to provide a compound of silicone elastomers or silicone rubbers having substantially improved properties over those heretofore produced and which can be cured or vulcanized.

It is still another object of the present invention to provide a pigment-reinforced silicone rubber which may be cured or vulcanized to the elastic state, giving tensile strengths in excess of 1000 lbs./sq. inch.

In accordance with my invention, various pigments, such as carbon black, finely divided silica, titanium dioxide, and the like, after treatment with the hydroxy-reactive compound to provide reactive surfaces is incorporated into silicon elastomers such, for example, as those made from one or more diorgano-dichlorosilanes including dimethyldichlorsilane and diphenyl-dichlorsilane, each substantially free of the trichloro and monochloro materials.

The active surfaces are provided in accordance with the invention herein by treating the pigments with one or more compounds free of polar groups capable of reacting with an isocyanate and having, or capable of forming compounds having, more than one carbon containing group capable of readily reacting by addition or condensation with alcoholic hydroxyl group to form a new and additional carbon-oxygen bond and further characterized by having the carbon of that group connected by two valence bonds to nitrogen or other carbon. Compounds of the greater reactivity and hence preferred are those having at least one —X=C=Y group where X is a member of the class consisting of —C and N and where Y is a chalcogen (preferably a member of the group consisting of oxygen and sulfur although selenium and tellurium may also be used to some extent) or —NR group where R is hydrogen or a monovalent hydrocarbon. Of the various compounds suitable, those having at least one and preferably more than one isocyanate (including isothiocyanate) groups appear to be most reactive. These materials can provide one or more —NCO, —NCS, —C=CO, and —C=CS groups for interaction with the hydroxyl of the silicon elastomer or silicon oil in substantially the same manner as is provided by the hydroxyl-reactive organosilanes, now specifically claimed in my above-mentioned copending application. Similarly, organic materials having a plurality of carbon atoms and with labile halogens such as compounds having the general formula $RX_n$, where R is a relatively nonvolatile hydrocarbon and X is chlorine and $n$ is two or more are also suitable for forming these interlocking bonds between pigment surfaces and silicone elastomer. Thus vinyl chloride and vinylidene chloride which polymerize to form compounds having a plurality of spaced halogen groups which condense with hydroxyl to form a new carbon-oxygen bond and HCl may be used. The polymers of these vinyl materials like other chlorine or bromine substituted aliphatic hydrocarbons containing spaced halogen attached to a carbon of a saturated group are relatively slow to react with hydroxyl under the normal conditions, but the interaction is hastened by active radiation in the ultra violet range and by high temperature such as above 300° F. Hence it is desirable if such are used to subject the treated pigment to high temperature or radiation preferably while in contact with the elastomer.

The isocyanates which are preferably used for treating pigments in accordance with the present invention should for best results have as above indicated more than one —NCO group, although, because of the compatability of organic groups with certain pigments, such as carbon black, some active NCO groups may even be provided on pigmented surfaces with an organo monoisocyanate instead of an organo polyisocyanate. Similar results may also be obtained with various pigments which, by pretreatment or otherwise, have hydrophobic surface characteristics so that they preferentially absorb organic materials. Thus, while in order to obtain good reinforcement of silicon rubbers in accordance with the present invention, it is apparently desirable to have hydroxyl-reactive groups protruding from the pigment surfaces after treatment. Such protruding groups may be provided in various ways as for example by a polyisocyanate having only part of its isocyanate groups reacted with the pigment surfaces by a plurality of mols of a monoisocyanate, only a part of which monoisocyanate groups are reacted with the pigment surfaces, and by monoisocyanate and a pigment having hydrophobic surfaces which preferentially adhere to the organic portion of the isocyanate. The polyisocyanates are preferred, however, and react more rapidly to produce the desired treatment.

The pigment having surfaces treated in accordance with the present invention may be incorporated into the silicon rubber either before or after it is prepared. Thus, the treated pigment may be incorporated into silicon elastomer by mixing it with the silicon oil or with the silanes or other silicon compounds used for preparing the silicon elastomer. It is thus seen that it may be mixed into monomeric materials used in forming the elastomer where they are in the liquid state and retained therein during the subsequent polymerization condensation reaction.

The surfaces of most pigments including even carbon black surprisingly contain surfaces (apparently hydroxyl or carboxyl groups) which are capable of reacting with the organic compounds containing the above groups as have the organic isocyanates and the like, to form a chemical linkage to the surface of the pigment, as evidenced by the fact that pigments suitably treated with such materials to provide only organic hydrophobic groups over their surfaces are no longer wettable by water but will float thereon. When there is plurality of hydroxyl-reactive groups in each molecule of treating material or when there is a bonding of a plurality of hydrophobic portions of molecules together, some of the hydroxyl-reactive groups may protrude from the pigment surface to form direct chemical bonds to other hydroxyl-containing materials.

In the preparation of rubbery silicone elastomers, it is desirable to have only monomeric materials that are capable of condensing bifunctionally, i. e., have only two groups that can combine with hydroxyl groups, so that the polymer will grow by condensation in only two directions and form long chains to give an elastic product. A compound with but one condensable or hydrolyzable group stops chain growth, and a compound with more than two such condensable groups, when present in a substantial amount, may cause cross linking with enhancement of hardness at the expense of rubbery properties. When the hydroxyl groups on the pigment surface are reacted with the silicone compounds containing only two hydroxyl reactive groups, direct attachment can obviously be had to the pigment particles only at the ends of polymer chains made up of the condensed bifunctionally reactive silicones. When the hydroxyl group on the pigment surface is reacted with compounds containing three or four hydrolyzable groups, or groups condensable or reactive with hydroxyl groups, even if one or two such groups are utilized for reaction with the pigment surface, these attached groups may still enter any part of bifunctionally growing chains. For this reason it is frequently desirable, even when the pigment is incorporated into the liquid polymerizable materials which are to form the silicone elastomers, to expose the pigment surface to the direct action of compounds having more than two groups capable of condensing with hydroxyl groups. Thus, it is desirable to contact the surface of the pigment with an organo tri-isocyanate when the pigment is later to be incorporated into the silicone monomer or silicon oil.

The treatment of the surfaces of the pigment or the condensation of the monomer in the presence of the pigment, or both, tend to saturate the adsorptive capacities of the pigment so that a curable rubber is obtained.

The pigments which provide the greatest improvement in properties of the elastomeric materials have relatively great surface areas and of all pigments the very high surface area silicas are preferred in that they give exceptional properties to the polymer when it is incorporated therein, in accordance with the present invention. Such finely divided silicas include the very finely divided silicas or silicious materials such for example as those prepared by burning ethyl silicate and collecting the residue by suitable electrostatic precipitation means. One may, however, also use iron oxide, titanium dioxide, calcium carbonates, as well as the other various complex calcium and silicious pigments, and also carbon black, which pigments have a surface area of 30 sq. meters per gram, and preferably more than 60 or 70 sq. meters per gram. Pigments with larger particle sizes, while they give some effect in accordance with the present invention, are not as effective as the finer particle size materials.

The isocyanates which are preferred, as aforementioned, may have one or preferably more isocyanate groups and/or equivalent isothiocyanate group attached to an organic group including alkyl groups of 1 to 12 carbon atoms, alkylene groups of 1 to 12 carbon atoms, alkyleneyl groups (unsaturated divalent aliphatic groups), aryl groups such as phenene and naphthenyl groups, etc., and cycloaliphatic and heterocyclic groups. The organic groups should have neither hydroxyl nor amino substituents without greatly decreasing the effectiveness of the isocyanates. They may have other types of substituents however. Functional groups are not desired because of possibility for interaction. The isocyanates preferably have a general formula $R(NCX)_n$, where R is any organic group which is free of functioning groups reactive with isocyanates such as hydroxyl, carboxyl, amino and the like. R, however, may be any organic group devoid of groups which readily react with isocyanate or isothioisocyanate. Examples of suitable organo isocyanates include hexamethyl di-isocyanates, toluene di-isocyanate, benzene di-isocyanate, and the well-recognized equivalent isothioisocyanates, and the methylene di-isocyanate and ethylenyl diisocyanate (having the general formula $C_2H_2(NCO)_2$). One may also use vinyl isocyanate, allyl isocyanate, vinyl phenyl isocyanates, and other monoisocyanates having a homopolymerizable unsaturated group, whereby polyisocyanate may be formed in situ on the pigment surface. In place of the isocyanates which as used generically include isothiocyanates and mixed isocyanate-isothiocyanate compounds any of which are suitable providing the isocyanate groups are separate and distinct and which are the preferred and outstanding pigment treating materials for pigments to be used in silicon rubbers, etc. Other compounds having one and preferably more than one separate and distinct group of the general formula $-Y=C=X$, wherein Y is carbon or nitrogen and X is sulfur, oxygen or $-NR$ where R is hydrogen or a monovalent hydrocarbon radical may be used. Examples of such other compounds are diketenes, dithiokentenes, dicarbodiimides, diketenimines and unsaturated ketenes such as vinylketene may be used in place of the isocyanate compounds although the pigment treatment is somewhat less satisfactory because of the much slower reactivity generally involved with these compounds. Examples of these less reactive but usable compounds include ketene, vinyl ketene, vinylthio ketene, hexane-2,9-diketene

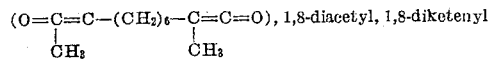

octane and the corresponding thioketenes,

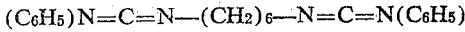

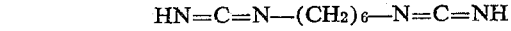

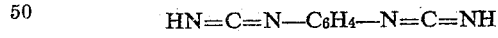

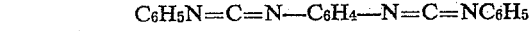

and

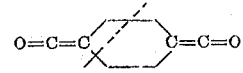

Still other compounds capable of forming the interlocking mechanism between hydroxyl of the silicone rubber and hydroxyl of the pigment are polymerizable vinyl chlorides and bromides and vinylidene chlorides and bromides and compounds having a plurality of spaced halogen (preferably chlorine) groups on different carbon atoms which are not attached by carbon-to-carbon double bonds. Thus the chlorine in polyvinyl chloride is much more reactive to hydroxyl in sun light than is the chlorine in vinyl chloride monomer or in chlorbenzene where the carbon carrying the chlorine is unsaturated. Examples of other chlorine containing compounds suitable are tetrachlorethane, dichlorethane, trimethylene trichloride and its higher homologues, etc.

The pigment may be treated in accordance with the present invention by suitably subjecting the surface to complete contact with one or more of the above mentioned hydroxyl reactive compounds such as the isocyanate or compounds containing the aforesaid group or groups —Y=C=X under reactive conditions which may be at room temperature or elevated temperature, depending upon the reactivity of the particular compound and the length of time in which the treatment may be conveniently continued. It is generally preferable to contact the pigment with the reactive compound in vapor form if it is readily vaporizable or, if not, to dissolve the isocyanate or reactive compound in a solvent, such as a suitable hydrocarbon or anhydrous ether or chlorinated solvent, or any similar liquid which does not react with the isocyanate etc. or the pigment and which may be extracted from the pigment by volatilization. The pigment, either in the presence of solvent or after being suitably dried in the absence of material capable of reacting with the hydroxyl reactive group such as an isocyanate (or isothioisocyanate) group, may be incorporated into the silicone elastomers or other silicon polymers to obtain outstanding benefits during the subsequent vulcanization treatment. When the treated pigment contains solvent, such as toluene, or the like, compatible with the silicone elastomer, the toluene may be evaporated from the mixture formed by incorporating the pigment wetted with solvent into the silicone elastomer by any suitable way as by milling or mastication procedures.

The treated pigment is generally used in amounts of at least 5%, and may be present in some instances in amounts as large as several hundred percent of the weight of the silicone elastomer. The amount of pigment depends on the stiffness of the desired compound and the strength desired in the final compound, and follows the ordinary principles utilized in rubber and silicone rubber compounding practices, as is well known in the art. Generally about 10% to 200% of pigment is used. Only a portion of the total pigment need be treated in accordance with the present invention to obtain substantial benefits, such as substantially increased tensile strength of the final vulcanizate. The vulcanization may be accomplished by any of the methods suitable for vulcanizing silicone rubbers, and generally accomplished by incorporating substantial amounts of strong free radical producing oxidizing agent, such as benzyl peroxide, into the pigmented elastomer and subjecting the same to elevated temperatures for a substantial period. Temperatures of 300° F. or more are usually used during vulcanization. The vulcanization procedure is well-known in the art and also forms no part in the present invention.

The following examples illustrate the invention.

*Example 1*

100 parts of a very dry finely divided silicious pigment obtainable under the trade name Santocel and having a surface area in excess of 50 square meters per gram is stirred into a 10% solution of toluene diisocyanate in anhydrous toluene. The slurry is heated at 75° C. to remove most of the excess liquid from the pigment and, without permitting the pigment to contact moisture, the treated pigment is immediately masticated into 200 parts of a commercially obtainable silicone rubber made up substantially of diorganosilicon oxide units linked together. The silicone-rubber-pigment mixture is thereupon combined with about 10 parts of benzoyl peroxide and shaped and cured into desirable form by heating at a curing temperature of about 400° F. for about 2 hours. The polymer thus cured is found to have properties considerably superior to those obtained with the same amount of pigment that had not been treated to provide active units for interaction with hydroxyl groups in the silicone rubber.

*Example 2*

A substantially equal amount of carbon black is substituted for the silicious pigment or finely divided silica of Example 1, other conditions being substantially the same. The results are similar except that the state of cure in the final article is somewhat less indicating that carbon black has some delaying action on the peroxide curing mechanism.

*Example 3*

About 100 parts of the finely divided well-dried titanium dioxide is treated with about 150 parts of a solution of vinyl isocyanate in anhydrous toluene. The mixture is allowed to remain about one to two days at room temperature and thereupon heated on a steam bath under vacuum for a sufficient time to remove most of the excess liquid. The treated pigment is then incorporated by mastication into about 200 parts of silicone rubber consisting essentially of diorgano silicon oxide units and containing the usual curing agents already dispersed therein. The product thus obtained is then molded in desirable form and cured in the mold for 2½ hours at about 350° F. to obtain a cured silicone rubber article having relatively high strength for silicon rubber-titanium oxide compositions.

In the above examples, the diisocyanate solution may be substituted in whole or in part by solutions of the other diisocyanates listed above including ethylene diisocyanate, vinyl isocyanate, the like may be used. Also, the other non-isocyanate compounds free of polar groups and having groups capable of reacting with hydroxyl to produce a new carbon-to-oxygen bond as above mentioned, while not as desirable and as effective as are the isocyanates, may also be used in place of these materials, especially when a longer reaction time is provided for reactivity with the pigment surface. The pigments in the above examples may be substituted by other pigments such for example as those mentioned previously as suitable for compounding silicone elastomers.

The silicone rubbers and the method of curing these rubbers forms no part of the present invention and may be substituted by other silicone rubbers or elastomers as such are obtainable. Any curing agents suitable for curing commercial silicone rubbers may be used.

The present invention permits the attainment of increased tensile strength in silicone elastomers which greatly increases their field of use. The shorter chain linkages with the least number of carbon-to-carbon bonds are usually preferred when the elastomer is to be subjected to highly elevated temperatures over considerable periods of times.

*Example 4*

100 parts of titanium dioxide are stirred into sufficient solution containing about 10% vinyl isocyanate and about 10% of toluene monoisocyanate. The amount of said solution is sufficient to easily wet the pigment, and the pigment is maintained in said solution with protection from atmosphere and moisture for about one week to permit interaction of the isocyanate with hydroxyl groups on the surface of the pigment. The slurry comprising pigment and solvent is then preferably subjected to elevated temperatures of a steam bath in order to eliminate most of the excess solvent. The treated pigment thus obtained is then stirred into a solution of an alkyd resin and drying oil of a type suitable for forming a good varnish film upon drying and hardening. The mixture thus obtained is thereupon emulsified in water comprising ammoni-casein as a protective colloid and a small amount of a surface active agent (.5 to 2%) such as an alkali metal soap or other surface active agent to provide a coating composition which when applied to surfaces and dried forms a film which has considerably more gloss than has the film produced in the same manner from pigments which are not treated to provide hydrophobic surfaces.

In place of the alkyd resin in the above example, one may utilize solutions of other condensation polymers such as synthetic phenolic resins and solutions or dispersions of the various elastomeric plastics such as styrene, vinyl chloride, copolymers of styrene and butadiene, and particularly those containing more than 50% of one or more styrenes etc., as well as other film-forming polymeric materials.

In place of the titanium dioxide in the last example, any other pigments such as those above described may also be used. The monoisocyanates having the general formula R—NCO, where R is selected from phenyl, ethyl, methyl, or other alkyl, aryl, or unsaturated aliphatic groups are usually preferred for the pigment treatments when the pigments are used in emulsions. When the material is polymerizable, as for example when a high molecular weight unsaturated polyester-styrene mixture is used as the binding material, an unsaturated polymerizable hydroxyl reactive organic compound as above described such as an unsaturated isocyanate or ketene etc. such as the butadiene isocyanate, allyl isocyanate, vinyl isocyanate, vinyl ketene, etc. are desirable for treatment of the pigment in order to form direct linkages to the polymerizable binding materials.

It is to be understood that in accordance with the provisions of the patent statutes, variations and modifications of the specific invention herein shown and described for purposes of illustration may be made without departing from the spirit of the invention.

What I claim is:

1. An article comprising a film-forming polymeric binding material and an inorganic pigment having on the surface portions thereof a residue from the treatment of said pigment with a hydrocarbon isocyanate free of olefinic unsaturation and free of functional groups other than isocyanate.

2. An article as defined in claim 1, wherein the film-forming polymeric material is a cured polymer of a conjugated butadiene.

3. An article as defined in claim 1, wherein the film-forming material is selected from a member of the group consisting of alkyd resins, synthetic phenolic resins, solutions and dispersions of polystyrene and co-polymers of styrene and butadiene.

4. An article as defined in claim 1 wherein said organic compound has a plurality of said isocyanate groups and wherein said pigment is siliceous.

5. An article as defined in claim 1 wherein the film-forming material is a butadiene-styrene copolymer.

6. A composition comprising a vulcanizable silicone rubber consisting essentially of diorgano silicone oxide units and having dispersed therethrough a finely divided inorganic pigment which has on surface portions thereof a residue from the treatment of said pigment with an organic compound which is free of functional groups other than isocyanate and which has a plurality of isocyanate groups.

7. A process of preparing a reinforced silicon elastomer which consists essentially of diorgano silicon oxide units, which process comprises exposing the surface of a finely divided inorganic pigment having a surface area of at least 20 square meters per gram to an organic compound which is free of functional groups other than isocyanate and which has at least two isocyanate groups, whereby said organic compound is joined to said pigment and then incorporating the thus treated pigment into said silicon elastomer.

8. A composition comprising a vulcanizable diorgano silicone elastomer consisting essentially of diorgano silicon oxide units and having dispersed therethrough a finely divided siliceous pigment which has on surface portions thereof a residue from the treatment of said pigment with an organic compound free of functional groups other than isocyanate and containing at least one active isocyanate group whereby said pigment is rendered more compatible with said silicone elastomer.

References Cited in the file of this patent

UNITED STATES PATENTS

| 2,356,005 | Roquemore | Aug. 15, 1944 |
| 2,578,605 | Sears | Dec. 11, 1951 |
| 2,601,336 | Smith-Johannsen | June 24, 1952 |
| 2,610,167 | Te Grotenhuis | Sept. 9, 1952 |
| 2,707,692 | Hecht | May 3, 1955 |

FOREIGN PATENTS

| 123,381 | Sweden | Nov. 23, 1948 |

OTHER REFERENCES

C. & E. News, 30, page 4720, November 10, 1952.